United States Patent
Grow et al.

(10) Patent No.: US 7,165,308 B2
(45) Date of Patent: Jan. 23, 2007

(54) DUAL DISK TRANSPORT MECHANISM PROCESSING TWO DISKS TILTED TOWARD EACH OTHER

(75) Inventors: John Grow, Gilroy, CA (US); Kwang Kon Kim, San Jose, CA (US); Dan Palmer, Gilroy, CA (US)

(73) Assignee: Maxtor Corporation, Longmont, CO (US)

( * ) Notice: Subject to any disclaimer, the term of this patent is extended or adjusted under 35 U.S.C. 154(b) by 388 days.

(21) Appl. No.: 10/435,361

(22) Filed: May 9, 2003

(65) Prior Publication Data

US 2003/0208899 A1    Nov. 13, 2003

Related U.S. Application Data

(60) Provisional application No. 60/379,234, filed on May 9, 2002, provisional application No. 60/378,968, filed on May 9, 2002.

(51) Int. Cl.
*B23P 25/00* (2006.01)
(52) U.S. Cl. .................. 29/458; 29/559; 29/603.17
(58) Field of Classification Search ............ 29/458, 29/559, 603.17, 603.22; 414/404, 811
See application file for complete search history.

(56) References Cited

U.S. PATENT DOCUMENTS

| | | | |
|---|---|---|---|
| 4,573,851 A | 3/1986 | Butler | 414/404 |
| 4,676,008 A | 6/1987 | Armstrong | 34/237 |
| 4,694,778 A | 9/1987 | Learn et al. | 118/728 |
| 4,695,217 A | 9/1987 | Lau | 414/404 |
| 4,819,579 A | 4/1989 | Jenkins | 118/728 |
| 4,840,530 A | 6/1989 | Nguyen | 414/404 |
| 4,856,957 A | 8/1989 | Lau et al. | 414/404 |
| 4,947,624 A | 8/1990 | Cones, Sr. et al. | 53/540 |
| 4,947,784 A | 8/1990 | Nishi | 414/404 |
| 4,958,982 A | 9/1990 | Champet et al. | 414/751.1 |
| 4,981,222 A | 1/1991 | Lee | 211/41 |
| 4,987,407 A | 1/1991 | Lee | 340/540 |

(Continued)

FOREIGN PATENT DOCUMENTS

EP    0 177 073    8/1985

(Continued)

OTHER PUBLICATIONS

Australian Written Opinion and Search Report, Dec. 17, 2004, Singapore Application No. SG200302857-8 Mar. 12, 2005 Invitiation to Respond to Written Opinion from Intellectual Property Office to Singapore to Tan Jinhwee, Eunice & Lim Chooeng.

*Primary Examiner*—Essama Omgba
(74) *Attorney, Agent, or Firm*—Sheridan Ross P.C.

(57) ABSTRACT

Various apparatus and methods are provided for handling and transporting pairs of gap merge disks. A transfer member is provided in one embodiment which engages the outer perimeter of a pair of disks at three locations. The transfer member is configured to induce an angled tilt to the respective disks such that the bottom perimeter edges of the disks are spaced apart and the top perimeter edges of the disks are in contact. A mandrel is also provided which is configured to engage a pair of disks oriented in this fashion at the center aperture for purposes of transferring the pair of disks from the transport device to a second location for processing or transfer to another processing device.

42 Claims, 5 Drawing Sheets

U.S. PATENT DOCUMENTS

| | | | | |
|---|---|---|---|---|
| 5,007,788 | A | 4/1991 | Asano et al. | 414/416.09 |
| 5,111,936 | A | 5/1992 | Kos | 206/334 |
| 5,125,784 | A | 6/1992 | Asano | 414/404 |
| 5,188,499 | A | 2/1993 | Tarng et al. | 414/404 |
| 5,314,107 | A | 5/1994 | D'Aragona et al. | 228/116 |
| 5,430,992 | A | 7/1995 | Olson | 53/399 |
| 5,486,134 | A | 1/1996 | Jones et al. | 451/209 |
| 5,620,295 | A | 4/1997 | Nishi | 414/416.11 |
| 5,820,449 | A | 10/1998 | Clover | 451/287 |
| 5,906,469 | A * | 5/1999 | Oka et al. | 414/416.08 |
| 5,976,255 | A | 11/1999 | Takaki et al. | 118/500 |
| 6,033,522 | A | 3/2000 | Iwata et al. | 156/345 |
| 6,107,599 | A | 8/2000 | Baumgart et al. | 219/121.77 |
| 6,345,947 | B1 | 2/2002 | Egashira | 414/225.01 |
| 6,354,794 | B2 * | 3/2002 | Sato et al. | 414/811 |
| 6,368,040 | B1 * | 4/2002 | Yamasaki et al. | 414/225.01 |
| 6,457,929 | B2 * | 10/2002 | Sato et al. | 414/404 |
| 6,582,279 | B1 | 6/2003 | Fox et al. | 451/37 |
| 6,612,801 | B1 | 9/2003 | Koguchi | 414/416.02 |
| 6,626,744 | B1 | 9/2003 | White et al. | 451/66 |
| 2003/0209389 | A1 | 11/2003 | Buitron et al. | 184/6 |
| 2003/0209421 | A1 | 11/2003 | Buitron et al. | 204/192.2 |
| 2003/0210498 | A1 | 11/2003 | Kim et al. | 360/135 |
| 2003/0211275 | A1 | 11/2003 | Buitron et al. | 428/64.1 |
| 2003/0211361 | A1 | 11/2003 | Kim et al. | 428/694 R |
| 2004/0013011 | A1 | 1/2004 | Valeri | 365/200 |
| 2004/0016214 | A1 | 1/2004 | Buitron | 53/474 |
| 2004/0035737 | A1 | 2/2004 | Buitron et al. | 206/454 |
| 2004/0068862 | A1 | 4/2004 | Buitron et al. | 29/604 |
| 2004/0069662 | A1 | 4/2004 | Buitron et al. | 206/307.1 |
| 2004/0070092 | A1 | 4/2004 | Buitron et al. | 264/1.33 |
| 2004/0070859 | A1 | 4/2004 | Crofton et al. | 360/1 |
| 2004/0071535 | A1 | 4/2004 | Crofton et al. | 414/416.09 |

FOREIGN PATENT DOCUMENTS

| | | | |
|---|---|---|---|
| EP | 0 192 244 | 2/1986 | |
| EP | 768704 | 4/1997 | 414/416.02 |
| JP | 7-263521 | 10/1995 | 414/416.02 |
| JP | 08273210 | 10/1996 | |
| JP | 2001232667 | 8/2001 | |

* cited by examiner

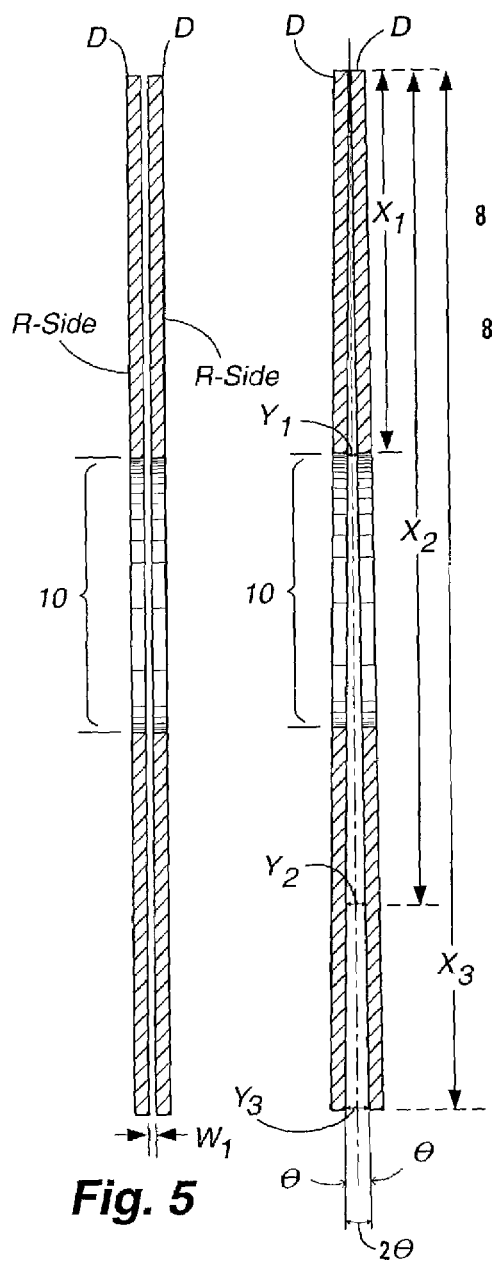
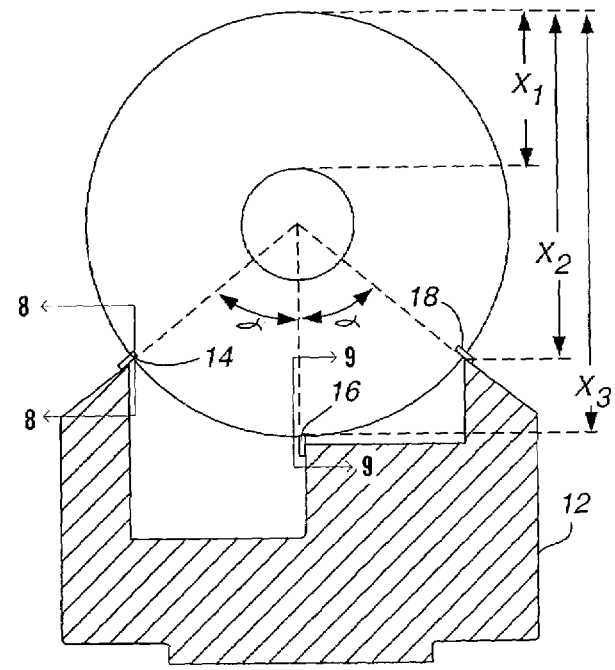
Fig. 7
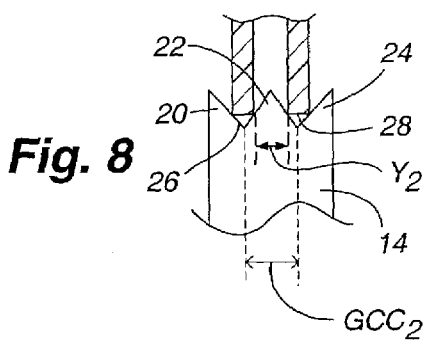
Fig. 8
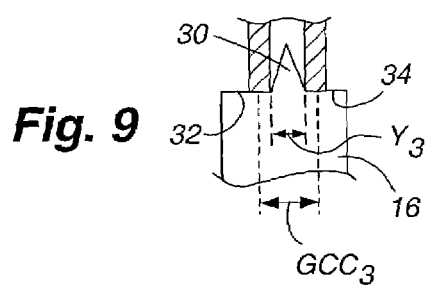
Fig. 9
Fig. 5
Fig. 6

US 7,165,308 B2

DUAL DISK TRANSPORT MECHANISM PROCESSING TWO DISKS TILTED TOWARD EACH OTHER

CROSS REFERENCE TO RELATED APPLICATIONS

Priority is claimed from U.S. Provisional Patent Application Ser. Nos. 60/379,234 and 60/378,968, both filed May 9, 2002, which are incorporated by reference herein in their entirety.

The subject matter of the present application is related to the following applications, each of which has a filing date of May 9, 2003: U.S. patent application Ser. No. 10/434,550 entitled "Single-Sided Sputtered Magnetic Recording Disks" in the name of Clasara et al. (Publication No. US-2003-0211361-A1); U.S. patent application Ser. No. 10/435,358 entitled "Information-Storage Media With Dissimilar Outer Diameter and/or Inner Diameter Chamfer Designs On Two Sides" in the name of Clasara et al. (Publication No. US-2003-0210498-A1); U.S. patent application Ser. No. 10/435,360 entitled "Method of Merging Two Disks Concentrically Without Gap Between Disks" in the name of Buitron (Publication No. US-2004-0016214-A1); U.S. patent application Ser. No. 10/434,551 entitled "Apparatus for Combining or Separating Disk Pairs Simultaneously" in the name of Buitron et al. (Publication No. US-2004-0035737-A1); U.S. patent application Ser. No. 10/435,572 entitled "Method of Simultaneous Two-Disk Processing of Single-Sided Magnetic Recording Disks" in the name of Buitron et al. (Publication No. US-2003-0211275-A1); U.S. patent application Ser. No. 10/435,161 entitled "W-Patterned Tools for Transporting/Handling Pairs of Disks" in the name of Buitron et al. (Publication No. US-2003-0209421-A1); U.S. patent application Ser. No. 10/435,295 entitled "Method for Servo Pattern Application on Single-Side Processed Disks in a Merged State" in the name of Valeri (Publication No. US-2004-0013011-A1); U.S. patent application Ser. No. 10/434,547 entitled "Method for Simultaneous Two-Disk Texturing" in the name of Ta et al. (Publication No. US-2004-0070092-A1); U.S. patent application Ser. No. 10/535,227 entitled "Cassette for Holding Disks of Multiple Form Factors" in the name of Buitron et al. (Publication No. US-2004-0069662-A1); U.S. patent application Ser. No. 10/434,546 entitled "Automated Merge Nest for Pairs of Magnetic Storage Disks" in the name of Crofton et al. (Publication No. US-2004-0071535-A1); U.S. patent application Ser. No. 10/435,293 entitled "Apparatus for Simultaneous Two-Disk Scrubbing and Washing" in the name of Crofton et al. (Publication No. US-2004-0070859-A1); U.S. patent application Ser. No. 10/435,362 entitled "Cassette Apparatus for Holding 25 Pairs of Disks for Manufacturing Process" in the name of Buitron et al. (Publication No. US-2004-0068862-A1); and U.S. patent application Ser. No. 10/434,540 entitled "Method of Lubricating Multiple Magnetic Storage Disks in Close Proximity" in the name of Crofton et al. (Publication No. US-2003-0209389-A1). Each of these applications is incorporated by reference in its entirety as if stated herein. All of these applications are commonly owned by the Assignee.

FIELD OF THE INVENTION

The present invention is directed to various apparatus and methods for handling pairs of hard memory disks. More specifically, the apparatus and methods apply to handling pairs of single-sided hard memory disks in various applications, primarily including sputtering processes.

BACKGROUND OF THE INVENTION

Hard disk drives are an efficient and cost effective solution for data storage. Depending upon the requirements of the particular application, a disk drive may include anywhere from one to eight hard disks and data may be stored on one or both surfaces of each disk. While hard disk drives are traditionally thought of as a component of a personal computer or as a network server, usage has expanded to include other storage applications such as set top boxes for recording and time shifting of television programs, personal digital assistants, cameras, music players and other consumer electronic devices, each having differing information storage capacity requirements.

Typically, hard memory disks are produced with functional magnetic recording capabilities on both sides or surfaces of the disk. In conventional practice, these hard disks are produced by subjecting both sides of a raw material substrate disk, such as glass, aluminum or some other suitable material, to numerous manufacturing processes. Active materials are deposited on both sides of the substrate disk and both sides of the disk are subject to full processing such that both sides of the disk may be referred to as active or functional from a memory storage stand point. The end result is that both sides of the finished disk have the necessary materials and characteristics required to effect magnetic recording and provide data storage. These are generally referred to as double-sided process disks. Assuming both surfaces pass certification testing and have no defects, both sides of the disk may be referred to as active or functional for memory storage purposes. These disks are referred as double-sided test pass disks. Double-sided test pass disks may be used in a disk drive for double-sided recording.

Conventional double-sided processing of hard memory disks involves a number of discrete steps. Typically, twenty-five substrate disks are placed in a plastic cassette, axially aligned in a single row. Because the disk manufacturing processes are conducted at different locations using different equipment, the cassettes are moved from work station to work station. For most processes, the substrate disks are individually removed from the cassette by automated equipment, both sides or surfaces of each disk are subjected to the particular process, and the processed disk is returned to the cassette. Once each disk has been fully processed and returned to the cassette, the cassette is transferred to the next work station for further processing of the disks.

More particularly, in a conventional double-sided disk manufacturing process, the substrate disks are initially subjected to data zone texturing. Texturing prepares the surfaces of the substrate disks to receive layers of materials which will provide the active or memory storage capabilities on each disk surface. Texturing may typically be accomplished in two ways: fixed abrasive texturing or free abrasive texturing. Fixed abrasive texturing is analogous to sanding, in which a fine grade sand paper or fabric is pressed against both sides of a spinning substrate disk to roughen or texturize both surfaces. Free abrasive texturing involves applying a rough woven fabric against the disk surfaces in the presence of a slurry. The slurry typically contains diamond particles, which perform the texturing, a coolant to reduce heat generated in the texturing process and deionized water as the base solution. Texturing is typically followed by washing to remove particulate generated during texturing.

Washing is a multi-stage process and usually includes scrubbing of the disk surfaces. The textured substrate disks are then subjected to a drying process. Drying is performed on an entire cassette of disk drives at a time. Following drying, the textured substrate disks are subjected to laser zone texturing. Laser zone texturing does not involve physically contacting and applying pressure against the substrate disk surfaces like data zone texturing. Rather, a laser beam is focused on and interacts with discrete portions of the disk surface, primarily to create an array of bumps for the head and slider assembly to land on and take off from. Laser zone texturing is performed one disk at a time. The disks are then washed again. Following a drying step, the disks are individually subjected to a process which adds layers of material to both surfaces for purposes of creating data storage capabilities. This can be accomplished by sputtering, deposition or by other techniques known to persons of skill in the art. Following the addition of layers of material to each surface, a lubricant layer typically is applied. The lubrication process can be accomplished by subjecting an entire cassette of disks to a liquid lubricant; it does not need to be done one disk at a time. Following lubrication, the disks are individually subjected to surface burnishing to remove asperities, enhance bonding of the lubricant to the disk surface and otherwise provide a generally uniform finish to the disk surface. Following burnishing, the disks are subjected to various types of testing. Examples of testing include glide testing to find and remove disks with asperities that could affect flying at the head/slider assembly and certification testing which is writing to and reading from the disk surfaces. Certification testing is also used to locate and remove disks with defects that make the surface unuseable for data storage. The finished disks can then be subjected to a servo-writing process and placed in disk drives, or placed in disk drives then subjected to servo-writing. The data zone texturing, laser zone texturing, scrubbing, sputtering, burnishing and testing processes are done one disk at a time, with each surface of a single disk being processed simultaneously.

Although the active materials and manufacturing processes, by their nature, are difficult and expensive to employ, over the years, the technology used to manufacture hard memory disks has rapidly progressed. As a result, the density of information that can be stored on a disk surface is remarkable. Indeed, double-sided test pass disks used in personal computers have much greater storage capacity than most consumers require during the useful life of the computer. Consumers thus are forced to pay substantial amounts for excess storage capacity and the components to access the excess storage capacity. This has caused some disk drive manufacturers, in some current applications, to manufacture and sell disk drives which utilize only one side of a double-sided test pass disk for storage purposes or which use the good side of a double-sided process disk where one surface passed certification testing and the second surface failed. In either case, the second surface, despite being fully processed, is unused. However, the disk drive manufacturer reduces its cost by eliminating the mechanical and electrical components needed to access the unused disk surface. These disk drives are referred to as single-side drives and are typically used in low-end or economy disk drives to appeal to the low cost end of the marketplace. Although this approach may reduce some cost, it does not reduce the wasted cost of manufacturing the unused storage surface of each disk. Thus, substantial savings can be achieved by not only manufacturing disks with a single active or functional side, but doing so in a cost-effective manner.

In contrast to a double-sided disk, a single-sided disk has only one functional memory surface with active recording materials. It is not a double-sided process disk where one side is not accessed or where one side has failed testing. Rather, manufacturing processes are applied in a controlled manner only to one side of the disk using unique single-sided processing techniques. In contrast to conventional double-sided disks, active recording materials are only applied to, and full processing is only conducted on, one side of the disk. Thus, substantial savings are achieved by eliminating processing the second side of each disk.

Additionally, the present invention achieves advantages by utilizing conventional double-sided disk manufacturing equipment and processes, with limited modification. The present invention enables simultaneous processing of two substrate disks through the same equipment and processes used to manufacture double-sided disks. Simultaneously processing two substrate disks results in the production of two single-sided disks in the same time and using essentially the same equipment as currently is used in the production of one double-sided disk. However, each single-sided disk has only a single active or functional surface. For illustrative purposes FIG. 1 shows a side-by-side schematic representation of the processing of one double-sided disk $D_d$, depicted on the left side of FIG. 1, versus the simultaneous processing of two single-sided disks $D_s$, depicted on the right side of FIG. 1. In each case, the double-sided disk or the two single-sided disks are subjected to the same process steps 1 through N, but the single-sided disk processing produces two disks in the same time the double-sided disk processing produces one disk.

A benefit provided by simultaneous single-sided processing of disks is a substantial cost savings achieved by eliminating the application of materials to and processing of one side of each disk. A further, and potentially significant cost savings can be achieved by utilizing existing double-sided disk processing equipment, with limited modification, to process pairs of single-sided disks. A still further benefit is a substantial increase in production (or reduction in processing time depending upon perspective). By utilizing existing double-sided disk processing equipment, approximately twice the productivity of a conventional double-sided production process is achieved (on the basis of numbers of disks produced) in the production of single-sided disks. Moreover, these increased productivity levels are achieved at approximately the same material cost, excepting the substrate disk, as producing half as many double-sided disks.

The simultaneous processing is achieved by combining two substrate disks together into a substrate disk pair or disk pair. A disk pair is two substrate disks that are oriented in a back-to-back relationship with the back-to-back surfaces either in direct physical contact or closely adjacent with a slight separation. The separation can be achieved with or without an intervening spacer. The substrate disk pair progresses through each process step in much the same way as one double-sided disk, but with only the outwardly facing surface of each disk in the pair being subjected to the full process. Thus, the outwardly facing surface of each pair becomes the active or functional surface and the inwardly facing surface of each pair remain inactive or non-functional.

For convenience and understanding, the following terms will have the definitions set forth:

a) "R-side" and "L-side" refer to the active side and inactive side of a disk, respectively. R-side is the side that does or will have active recording materials and memory capability. The R-side may also be referred to as the active or functional side. The L-side is the side that has little or no active recording materials or memory capabilities; it is non-functional or inactive from a data storage stand point.

b) "Merge" means to bring two disks closer together to form a pair of disks, a disk pair or a substrate pair.

c) "Demerge," conversely, means that a merged pair of disks is separated from each other.

d) "Disk" means a finished memory disk and all predecessor configurations during the manufacturing process starting with a substrate disk and progressing to a finished memory disk, depending upon the context of the sentence in which it is used.

e) "Disk pair" or "substrate pair" means two disks positioned in contact merge, gap merge or spacer merge orientation.

f) "Double-sided disk" means a single disk which has been subjected to double-sided processing, whether or not both sides of the disk have passed testing or only one side has passed testing.

g) "Gap merge" means a pair of disks that have been merged, but a space is maintained between the two merged disks. One or more spacers may or may not be used to maintain the gap or space. Gap merge includes both concentric and non-concentric merge. It should be understood that there is no precise dimension or limit to the space between the disks that causes them to be gap merged. Gap merge also includes the situation where the gap between the disks gradually decreases from one perimeter edge to the opposite perimeter edge of the disks when the two disks are angled toward each other. An example is when the bottom perimeter edges of the disks are spaced apart and the upper perimeter edges are in contact.

h) "Single-sided disks" means a single disk which has been subjected to single-side processing, where only one surface of the disk is fully processed.

i) "Spacer merge" means a spacer body is used to create spacing between two gap-merged disks.

j) "Contact merge" means a merged pair of disks where the inside surface of each disk is in contact with the inside surface of the other disk. Contact merge includes concentric and non-concentric merge.

k) "Concentric merge" means that two merged disks have the same axis and, assuming the two disks have the same outside diameter and inside diameter (as defined by the center aperture), their outer and inner perimeter edges are aligned.

l) "Concentric contact merge" means a pair of disks that are oriented in both a contact merge and a concentric merge.

m) "Non-concentric merge" or "off-centered merge" means the two merged disks are not concentric to each other or their perimeter edges are not aligned.

n) "Non-concentric contact merge" means the two contact merged disks are not concentric to each other or their perimeter edges are not aligned.

Referring to FIG. 2, a cross-section of a pair of gap-merged disks is shown. The R-side (active or functional side) is the outwardly facing surface R of each disk within the pair. The L-side (inactive or nonfunctional side) is the inwardly facing surface L of each disk within the pair. In comparison, a cross-section of a pair of concentric contact merged disks is shown in FIG. 3. The relative orientation of the R-side and L-side of each disk remains the same, however, the L-side of each disk of the pair are in contact and the outer and inner perimeter P of each disk is aligned with the outer and inner perimeter P of the other disk.

A conventional double-sided disk is shown in FIG. 4. The left side surface is referred to as the "A" side and the right side surface is referred to as the "B" side. Both the A and B sides are subjected to processing, including the addition of active or magnetic materials. In contrast, with reference to FIGS. 2 and 3, the R-side of each disk in a pair of disks is oriented on the outside of the pair and is subjected to processing in the same fashion as the A and B sides of a double-sided disk. Conversely, the L-side of each disk in a pair of disks is oriented on the inside of the pair and is not subjected to full processing in the same fashion as the A and B sides of a double-sided disk.

SUMMARY OF THE INVENTION

These and other benefits are addressed by the various embodiments and configurations of the present invention. For example, a benefit provided by one embodiment of the present invention is the ability to handle and transport two disks or substrate disks as a single pair of disks. Another benefit is that the pair of disks can be positioned in close proximity to each other, including being in a partial contact orientation. The ability to handle and manipulate pairs of disks in this manner affords yet another benefit which is the ability to simultaneously process pairs of disks using existing processing equipment originally designed and built for manufacturing conventional double-sided disks one at a time. In turn, these advantages allow increased output in the production of finished disks by the ability to process two disks simultaneously.

In one embodiment, a transport device for pairs of disks is provided. The transport device contacts the disks at three discrete locations along the bottom outer perimeter edges of the disks. The transport device typically moves a pair of gap merge disks vertically, for example, from a position where the disks are in a disk cassette to a position above the disk cassette where the pair of disks may be engaged by a second transport device or undergo processing.

In the preferred embodiment, the transport device is provided with three disk engaging blades which are configured to orient the pair of disks in a position angled toward each other such that there is a space between the disks at their lower perimeter edge and such that the disks are touching at their upper perimeter edge. This orientation creates a fourth point of contact, the point where the disks are touching, which provides additional stability to the disk pair during handling and transport. The invention may be utilized with disks of any size and may also be utilized in the form of a mandrel for engaging the disks at their center aperture.

BRIEF DESCRIPTION OF THE DRAWINGS

FIG. 5 is cross-section of a pair of gap merge disks in which the disks are parallel to each other and a uniform space is formed between the disks.

FIG. 6 is a cross-section of a pair of gap merge disks in which the disks do not have a uniform space between them and are touching at their upper perimeter edge.

FIG. 7 is a front plan view of one embodiment of the present invention.

FIG. 8 is a cross-section taken along line 8—8 of FIG. 7.

FIG. 9 is a cross-section taken along line 9—9 of FIG. 7.

Figure 1:
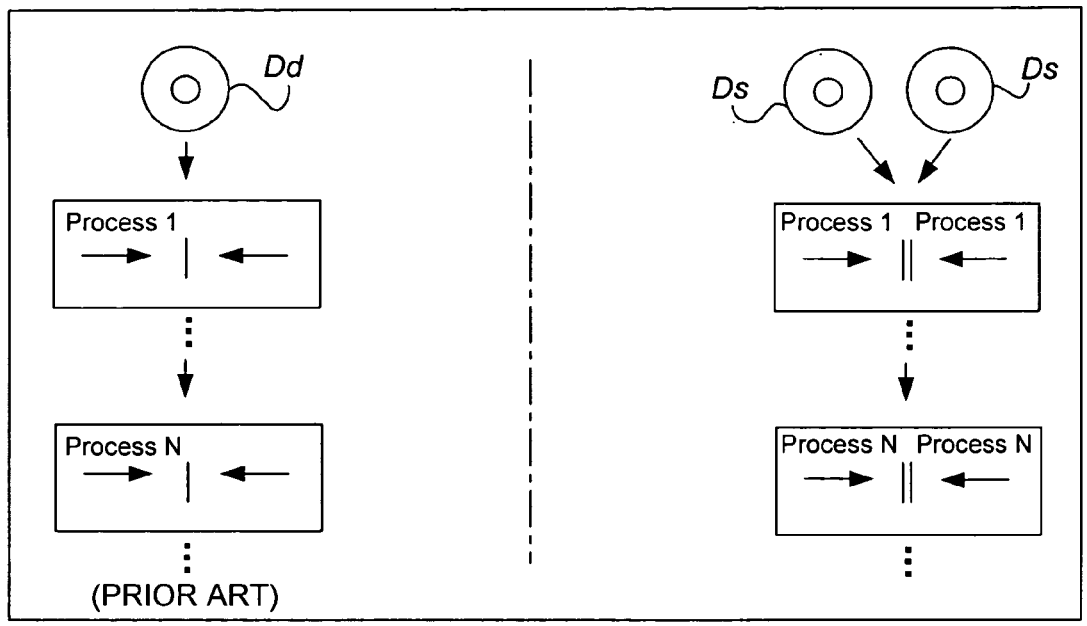
FIG. 1 is a schematic of a double-sided disk manufacturing process, on the left, and a schematic of a single-sided disk manufacturing process, on the right.
Figure 2:
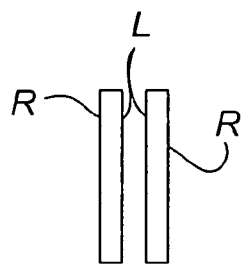
FIG. 2 is a cross-section of a pair of gap merged disks.
Figure 2:
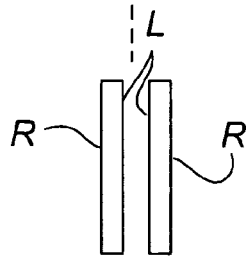
Figure 3:
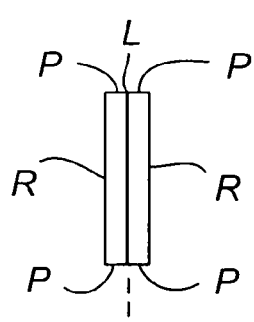
FIG. 3 is a cross-section of a pair of concentric contact merged disks.
Figure 3:
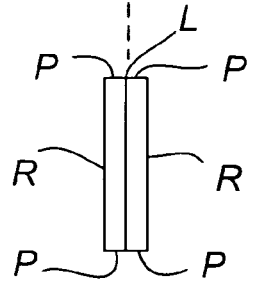
Figure 4:
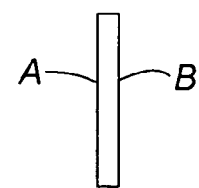
FIG. 4 is a cross-section of a conventional double-sided process disk.
Figure 4:
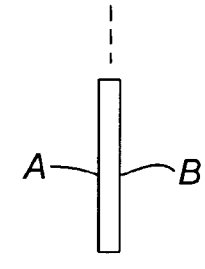

It should be understood that the drawings are not necessarily to scale. In certain instances, details which are not necessary for an understanding of the invention or which render other details difficult to perceive may have been omitted. It should be understood, of course, that the invention is not necessarily limited to the particular embodiments illustrated herein.

DETAILED DESCRIPTION OF THE PREFERRED EMBODIMENT

The present invention is directed to various apparatus and methods for handling and transporting pairs of single-sided hard memory disks. More specifically, the pairs of disks are handled, transported and maintained in a gap merge orientation. In gap merge orientation, the outwardly facing surface of each disk within the pair is or will be an active surface (R-side) and the inwardly facing or back-to-back surface of each disk within the pair is or will be an inactive, non-functional (L-side) disk surface, depending upon when in the overall process the gap merge occurs. The gap merge orientation may have a uniform spacing between the disks D when the disks are parallel to each other, or the spacing may gradually decrease from the one perimeter edge of the opposite perimeter edge when the two disks D are at an angle relative to each other, such as when the upper perimeter edges of the disks are in contact and the bottom perimeter edges are spaced apart. An example of each of these orientations is illustrated in FIGS. 5 and 6, respectively.

It should be appreciated that the present invention may be used with disks of other sizes, shapes, diameter and/or thickness. However, for illustrative purposes, the present specification addresses disks or substrate disks of one general size, namely, 95-millimeter diameter disks having a 25 millimeter diameter center aperture 10 and a thickness of 0.05 inches. A gap merge pair of disks of this size which are parallel (FIG. 5) will preferably have a spacing or gap $W_1$ of approximately 0.025 inches. If the pair of disks are angled relative to each other, such as when the top edge of the disks are in contact (FIG. 6), the preferred spacing or gap $Y_3$ at the bottom outside perimeter is approximately 0.075 inches and the spacing $Y_1$ at the upper edge of the central aperture 10 of the disks is approximately 0.025 inches. In this latter gap merge orientation, it is preferred that each disk is tilted at an angle θ of approximately 0.6 degrees, creating an angle 2θ between both disks of approximately 1.2 degrees. Either gap merge orientation is sufficiently stable to allow the disk pairs to be handled and transported without concern for dropping one or both disks. However, the gap merge orientation with the top inside edge of each disk in contact (FIG. 6) provides additional stability because it provides an additional point of contact for each disk. Moreover, one theory of simultaneous single-sided disk manufacture suggests that, if one disk of a pair falls from a handling mechanism, it is preferred that both disks of the pair fall. Orienting the disks at an angle induces instability in a second disk should the first disk dislodge and fall.

In one embodiment, shown in FIGS. 7–10, a disk handling or transport device maintains disk pairs in a gap merge orientation where the disks are angled slightly toward each other, allowing the upper inside edge of the disks to contact. (See FIG. 6). As shown in FIG. 7, the lift body 12 contacts the outside lower perimeter edges of the disks in three locations. Three disk blades 14, 16 and 18 are connected to the lift body and engage the perimeter edges of each disk. In this embodiment, the outer two disk blades 14, 18, shown in FIG. 8, have a different shape than the central disk blade 16, shown in FIG. 9. These blades are designed to maintain the orientation and spacing shown in FIG. 6. Thus, as can be appreciated, the shape of the disk contacting edge must be different for the outer blades 14, 18 than the central blade 16 because the disks are spaced differently at those two locations. It should also be appreciated that the center blade 16 can have a W-shaped disk contacting edge, like shown in FIG. 8, for the outer blades 14 and 18.

With reference to FIG. 8, the outer blades 14, 18 have a W-shaped disk contacting edge. They are preferably positioned at 55 degrees from the vertical centerline of the disk (α in FIG. 7). Three teeth 20, 22, 24 form two adjacent slots 26, 28 in which the outer perimeter edges of the two disks rest. The distance $GCC_2$ represents the distance between the centerline of the two disks (the gap center-to-center distance: GCC). It is also a measure of the distance between the centerline of the two slots 26, 28 at this point. With 95 millimeter diameter disks having a 0.05 inch thickness and tilted at 0.6 degrees, the distance $GCC_2$ will be 0.110 inches. The distance measured from L-side to L-side at this same position, $Y_2$ in FIG. 6, will be 0.060 inches. The difference is one-half the thickness of the two disks (or the thickness t of one disk).

Figure 10:
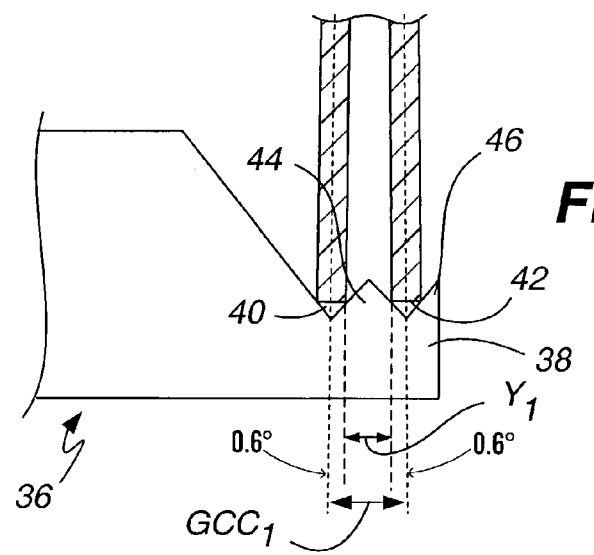
FIG. 10 is a partial plan view of a mandrel engaging a pair of gap merge disks; shown in cross-section, such as depicted in FIG. 6.

With reference to FIG. 9, one embodiment of the center blade 16 is shown. The disk contacting edge includes a single center tooth 30. This tooth serves to separate the two disks, imparting the angular tilt to each one. The center tooth 22 on the outer blades serve the same purpose. The outer teeth 20, 24 on the outer blades restrain the disks and prevent the disks from tilting more than intended. The shoulders 32, 34 also provide some support for the disks. The center blade is positioned at the bottom perimeter edge of the two disks where the separation is the largest. As shown in FIG. 6, the distance $Y_3$ between the L-sides of the two disks at this point is 0.75 inches. In comparison, the distance $GCC_3$ between centerlines of the two disks, given their 0.05 inch thickness, is 0.125 inches. As shown in FIG. 10, a mandrel can also be used to engage the disk pair. The mandrel 36, sometimes also referred to as a transfer arm button, serves the purpose of transporting a disk from a first location to a second location, explained in more detail below. The mandrel comprises an arm 38 with two grooves 40, 42 at the distal end for engaging the upper inside diameter edges of the disks formed by the aperture 10 at the center of the disks. A center tooth 44 maintains separation of the disks and an outer tooth 46 prevents the outer disk from dislodging from the arm 38.

The orientation of these grooves are similarly designed to maintain the gap orientation shown in FIG. 6 while permitting engagement of the tilted disks. As previously noted in connection with FIG. 6, the distance $Y_1$ between the L-sides of each disk at this point is 0.025 inches. The distance $GCC_1$, measured between the centerlines of the disks or between the apexes of the two grooves, is 0.075 inches.

Figure 11:
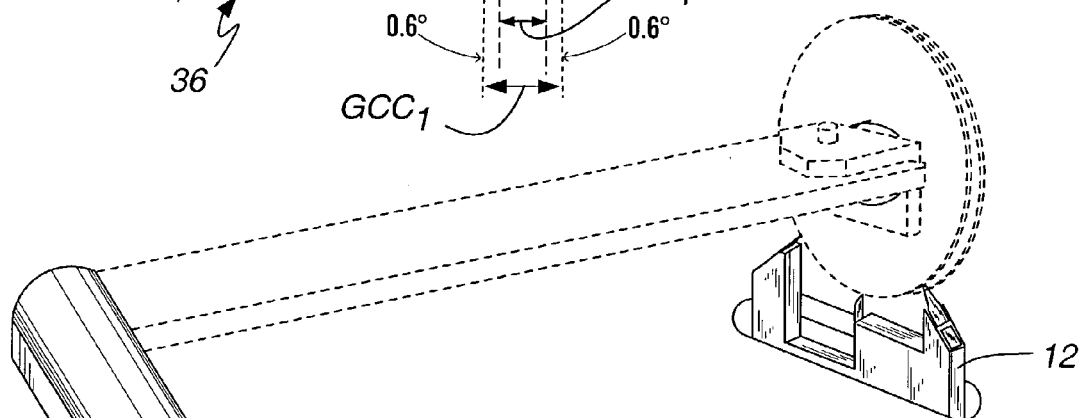
FIG. 11 is a perspective view of the embodiments of FIGS. 5 and 10 working in combination.
Figure 11:
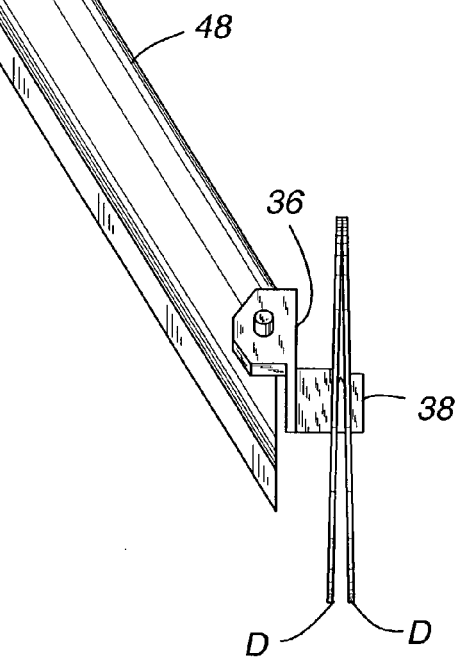
Figure 12:
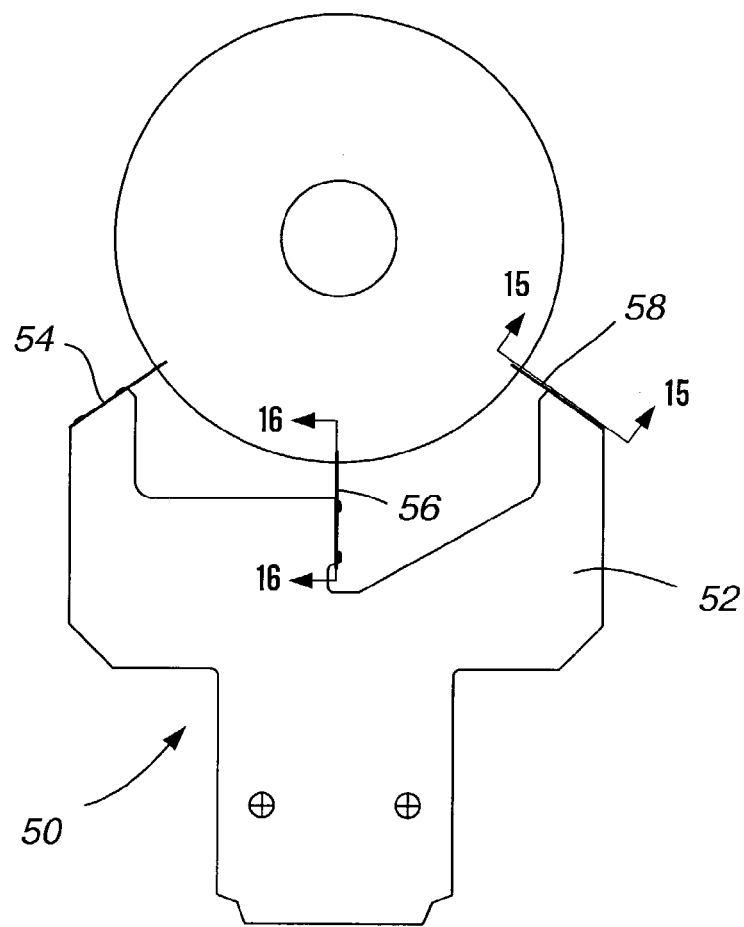
FIG. 12 is a front plan view of an alternative embodiment of the present invention.
Figure 13:
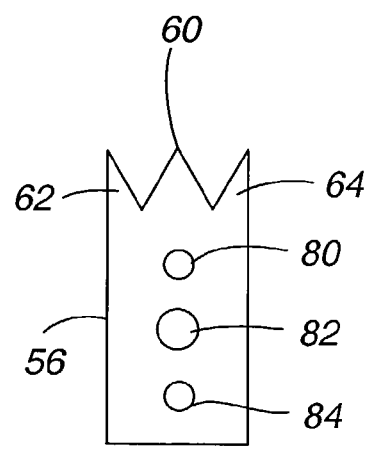
FIG. 13 is a front plan view of a disk engaging blade of the present invention.
Figure 14:
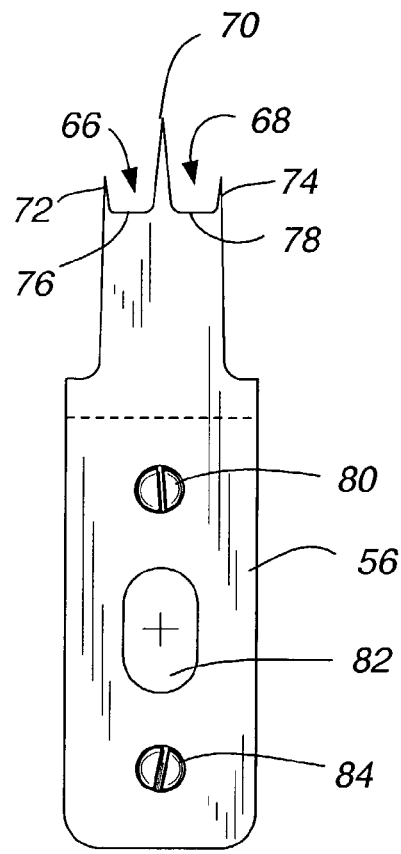
FIG. 14 is a front plan view of a second embodiment of a disk engaging blade of the present invention.
Figure 15:
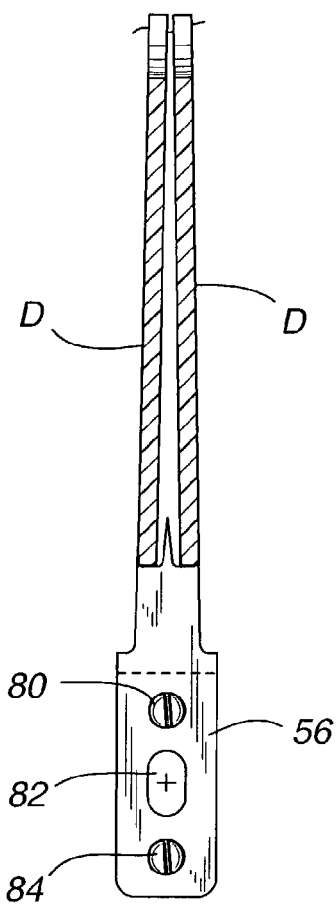
FIG. 15 is a cross-section view taken along line 15—15 of FIG. 12.
Figure 16:
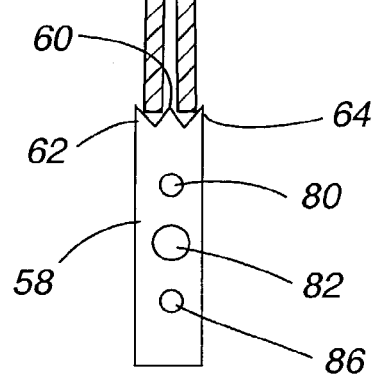
FIG. 16 is a cross-section view taken along line 16—16 of FIG. 12.

FIG. 11 depicts a transfer system in which a moveable transport arm 48 with a mandrel or transfer arm button 36 is disposed at its distal end. The transfer system typically performs at least two tasks. In one scenario, it removes a pair of disks from a cassette at a first location and transfers the disk pair to a second location where the disk pair is transferred to a lift body 12 (shown in phantom). In a second scenario, a first lift member removes the disk pair from a cassette and the transfer system moves the disk pair from the first lift body to a second lift body at a second location (shown in phantom). In each scenario, the mandrel 36 engages the disks at their central aperture, such as shown in FIG. 10. The transfer system then moves the pair of disks to a second location where the disks are transferred to a lift member. An example where a transfer of these types occurs is in a sputtering process where pairs of disks must be moved among a plurality of processing stations. For example, there are 14 stations in the Intevac NDP 250B sputter system. Each pair of disks is removed from a disk cassette and transferred to a lift body 12 which sequentially moves between each of the 14 stations. When the processing is complete, the pairs of disks are transferred from the lift body back to a cassette.

The gap merge orientation shown in FIG. 6, with a portion of the top perimeter edge of each disk in contact, is accomplished by the aid of a tilted mounting mechanism, whether it be the mandrel which engages the disks of the center aperture or the blades of the lift member which engages the disks at three points along the lower perimeter edge of the disks. The groove or channel designs are such that, when picking up disks, they create a tilt from vertical at an angle θ:

$$\text{where } \theta = \sin^{-1}\left(\frac{G/2}{X_1}\right),$$

where G is the gap distance measured between the L-side of each disk in a gap merge pair (and is selected by the disk manufacturer to meet manufacturing needs, such as machine tolerances) (G is $W_1$ in FIG. 5 and $Y_1$ in FIG. 6), where $X_1$ is the distance from the outside edge to the inside edge of the disk, and where a tilt angle between the two disks in the pair would be 2θ.

These dimensions are shown in FIGS. 6–10. In the case of 95 millimeter diameter disks with a desired or selected gap distance G of 0.025 inches and a disk thickness of 0.050 inches, θ is approximately 0.6 degrees and 2θ is approximately 1.2 degrees.

The wider gap created at the bottom perimeter or edge of the disks provides an advantage when the two disks are transferred onto the three blades of a lift member 12. The wider gap at the bottom facilitates placement of one disk in one groove 26 of the blade, and placement of the other disk in the other groove 28. The wider spread orientation technique allows a margin for error in transfers between the lift member 12 and the mandrel 36.

When two disks are placed on the three blades of the lift member 12 by the mandrel 36, the center or lower level blade 16, disposed along the vertical centerline of the disks, should have a wider gap center-to-center distance than the outer blades 14, 18. The best positioning stability is achieved by adopting blade designs with gap center-to-center distances that are proportionate to the vertical distances from the top perimeter edge of the disks to the location of the blade in question. The following formula applies:

$$X1:X2:X3=Y1:Y2:Y3$$

where X1 is the distance from the disk outside diameter (OD) to inside diameter (ID)

X2 is the distance from the disk top edge to the outside blade 14 or 16 disk contacting points X3 is the disk outside diameter Y1 is the predetermined gap between the two disks Y2 is the disk gap at the outside blade 14, 18 disk contacting points Y3 is the disk gap at the center blade 16 disk contacting points and then GCC (gap center-to-center) distance=Y+t, where t is the disk thickness.

A wider gap center-to-center design for the center blade 16 facilitates keeping the two disks in contact at the top. A four-point contact (FIG. 6) is more stable during transport compared to parallel gap merge (FIG. 5) transport where there are only three contacts between the disks and the blades.

The examples and illustrations given herein are for one embodiment where the predetermined space between the gap merge disks is 0.025 inches, the disks are 0.050 inches thick, have a 95 millimeter outside diameter (OD) and a 25 millimeter inside diameter (ID). The concept of moving two gap merge disks simultaneously with the two disks touching at the top is extendable to other gap merge transport involving wider or narrower gaps (e.g. 0.010 to 0.10 inches) and other disk form factors. For example, using the same size disks, the tilt angle θ for the case of a predetermining gap merge space $Y_1$ of 0.050 inches will change to approximately 1 degree and the upper or outer blades 14, 18 will have gap center-to-center distances $GCC_2$ of approximately 0.170 inches and a lower or center blade 16 gap center-to-center distance $GCC_3$ of approximately 0.20 inches.

A second embodiment of a transport device or lift member 50 is shown in FIGS. 12–16. Similarly, the lift member comprises a main body 52 with three disk engaging blades 54, 56, 58. The outer blades 54, 58, shown in FIG. 13, contact the outer perimeter edge of the disk pair at an angle of 55 degrees from the vertical center line of the disks. The center tooth 60 primarily serves to force the two disks apart. Outer teeth 62, 64 restrain the disk from falling off the blade. The outer blades 54, 58 are identical to the outer blades 14 and 18 shown in FIG. 7. The center blade 56 is different from center blade 16 in the first embodiment. The disk engaging edge provides two grooves 66, 68 separated by a central wedge 70 which maintains the disks at the determined spacing. Outer edges or teeth 72, 74 maintain the disks within the grooves. The flat bottom portion 76, 78 of each groove or channel is dimensioned to allow engagement with the outer edge of the disk and, therefore is the same as or slightly wider than the thickness of a disk. As mentioned previously in connection with the embodiment of FIGS.

7–10, the angled surfaces of the teeth 60 and 70 assist in aligning the disks within each groove and at the desired tilt or angle.

Three apertures 80, 82, 84 are provided to secure the blades to the main body and to permit adjusting of the position of each blade relative to the main body. The adjustability permits each blade to be properly positioned relative to the others to properly and securely hold the disks. It further allows replacement of damaged blades or substitution of differently configured blades for accommodating disks of different sizes or to position disks at different angles. Although not shown in FIGS. 7–10, the blades 14, 16, 18 would have similar features to allow replacement and adjustable positioning. Alternatively, the blades may be permanently attached to the lift body 52 and not capable of change.

The blades and lifter body of both embodiments may be made from appropriate materials to be utilized in any process within the overall disk manufacturing processes. For example, if used in a high temperature environment, such as sputtering, they can be made with an etching process from 304 or 316 stainless steel (full hard) or suitable aluminum alloys.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of manufacturing hard memory disks for use in a disk drive, the disks having an outer perimeter and a central aperture defining an inside perimeter, the method comprising:
    a. providing at least one pair of disks at a first location with a space between the disks;
    b. contacting each pair of disks comprising the at least one pair of disks with a transfer member;
    c. causing the disks of each pair of disks to contact each other along a portion of their outer perimeter and form an angular space between the disks of each pair;
    d. moving the at least one pair of disks to a second location.

2. The method of claim 1, wherein said transfer member contacts the disks comprising each at least one pair of disks at a plurality of locations along the outer perimeter of the disks.

3. The method of claim 1, wherein the disks of each at least one pair of disks are substantially vertically oriented to have an upper outer perimeter and a lower outer perimeter and contact each other along their upper outer perimeter.

4. The method of claim 1, wherein said transfer member forms an angular space between the disks of each at least one pair of disks which is approximately 1.2 degrees.

5. The method of claim 1, wherein the disks of each at least one pair of disks are substantially vertically oriented to have an upper outer perimeter and a lower outer perimeter and said transfer member contacts the disks comprising each at least one pair of disks along a portion of the outer perimeter of the disks.

6. The method of claim 1, wherein said transfer member contacts the disks comprising each at least one pair of disks along the inside perimeter of the disks.

7. A method of manufacturing single-sided hard memory disks, the disks having an outer perimeter and a central aperture defining an inside perimeter, the method comprising:
    a. providing a pair of disks at a first location with a space between the disks;
    b. positioning the pair of disks in a gap merge orientation with no contact between the disks of the pair;
    c. contacting the pair of disks with a first transfer member;
    d. causing the disks to contact each other along a portion of their outer perimeter to form an angular space between the disks;
    e. moving the pair of disks to a second location.

8. The method of claim 7, wherein said contact occurs along a portion of the outer perimeter of said disks.

9. The method of claim 8, wherein the pair of disks are substantially vertically oriented having an upper outer perimeter and a lower outer perimeter and said contact occurs along a portion of the upper outer perimeter of said disks.

10. The method of claim 7, wherein said transfer member contacts the disks at a plurality of separate locations along the outer perimeter of the disks.

11. The method of claim 7, wherein the pair of disks are substantially vertically oriented having an upper outer perimeter and a lower outer perimeter, and said transfer member contacts the disks along a portion of the lower outer perimeter of the disks.

12. The method of claim 7, wherein said transfer member contacts the disks along the inside perimeter of the disks.

13. The method of claim 7, further comprising transferring the pair of disks at the second location to a second transfer tool.

14. The method of claim 13, further comprising maintaining contact between the disks during transfer.

15. The method of claim 14, further comprising moving the disks to a third location.

16. The method of claim 15, further comprising processing the disks at the third location.

17. The method of claim 16, further comprising returning the disks to the first transfer tool.

18. The method of claim 13, wherein transferring the disks to a second transfer tool comprises engaging the disks at their inside perimeter with the second transfer tool.

19. The method of claim 13, wherein transferring the disks to a second transfer tool comprises engaging the disks at their outer perimeter with the second transfer tool.

20. A method of manufacturing single-sided hard memory disks for use in disk drives, the disks having an outer perimeter and a central aperture defining an inside perimeter, the method comprising:
  a. positioning a carrier containing a plurality of disks at a first location;
  b. orienting the plurality of disks in pairs in the carrier wherein for each pair of disks the surface of each disk facing the surface of the other disk in each pair is the inside surface of a disk and the opposite surface of each disk is the outside surface;
  c. removing a pair of disks from the carrier with a space between the inside surfaces of each disk and contact along the outer perimeter edges of the disks in contact;
  d. transferring the pair of disks to a second location;
  e. processing the disks at said second location.

21. The method of claim 20, wherein the step of processing the disks comprises processing substantially only the outside surfaces of each disk in the pair of disks.

22. The method of claim 20, further comprising transferring said pair of disks to a carrier following processing of the disks.

23. The method of claim 20, wherein processing the disks at a second location comprises adding material to the outside surface of each disk in the pair of disks.

24. The method of claim 23, wherein said process step comprises sputtering.

25. The method of claim 20, further comprising orienting said plurality of disks in the carrier in a spaced axial alignment and in pairs, with a first space between each two disks comprising a pair of disks and a second space between each pair of adjacent pairs of disks, wherein the first space is less than the second space.

26. The method of claim 20, wherein the step of removing said pair of disks comprises contacting said disks at a plurality of locations along the outer perimeter of each disk.

27. The method of claim 20, further comprising processing the disks at additional locations.

28. The method of claim 27, further comprising placing the pair of disks in a carrier following processing.

29. The method of claim 20, wherein the disks are substantially vertically oriented having an upper outer perimeter and a lower outer perimeter, and said disks contact along the upper outer perimeter of the disks.

30. The method of claim 20, further comprising forming an angle between the disks.

31. The method of claim 30, wherein the angle between the disks is approximately 1.2 degrees.

32. A method of manufacturing single-sided hard memory disks for use in disk drives, the disks having an outer perimeter and a central aperture defining an inside perimeter, the method comprising:
  a. positioning a carrier containing a plurality of disks at a first location, the carrier having a pair of side walls, a pair of end walls, an open top and an open bottom and defining an interior space;
  b. contacting a pair of disks positioned in said carrier with a first transfer member;
  c. causing said pair of disks to contact each other along at least a portion of their outer perimeter to form an angular space between said pair of disks while the disks are at least partially positioned in the interior space of the carrier;
  d. moving the disks to a second location.

33. The method of claim 32, wherein said first transfer member contacts the disks along a portion of the outer perimeter of the disks.

34. The method of claim 33, wherein said first transfer member contacts the disks at a plurality of separate locations.

35. The method of claim 33, wherein the pair of disks are substantially vertically oriented having an upper outer perimeter and a lower outer perimeter and the contact between the disks occurs along a portion of the upper outer perimeter of the disks.

36. The method of claim 33, wherein the first transfer member contacts the disks at the lower outer perimeter.

37. The method of claim 33, wherein the first transfer member contacts the pair of disks at the inside perimeter of the disks.

38. The method of claim 37, wherein the first transfer member contacts the inside perimeter of the disks at separate locations.

39. The method of claim 36, further comprising transferring the pair of disks to a second transfer tool at a second location.

40. The method of claim 39, further comprising maintaining contact between the disks and at least the first or second transfer tool during the transfer.

41. The method of claim 32, following moving the disks to a second location, further comprising processing the disks.

42. The method of claim 41, further comprising returning the disks to a carrier.

* * * * *